US010440071B2

(12) United States Patent
Louchheim et al.

(10) Patent No.: US 10,440,071 B2
(45) Date of Patent: *Oct. 8, 2019

(54) TECHNOLOGIES FOR AUDIOVISUAL COMMUNICATION USING INTERESTINGNESS ALGORITHMS

(71) Applicant: Intel Corporation, Santa Clara, CA (US)

(72) Inventors: Sigal Louchheim, El Dorado Hills, CA (US); Omer Ben-Shalom, Rishon Le-Tzion (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/197,937

(22) Filed: Jun. 30, 2016

(65) Prior Publication Data

US 2016/0381095 A1 Dec. 29, 2016

Related U.S. Application Data

(63) Continuation of application No. 14/317,607, filed on Jun. 27, 2014, now Pat. No. 9,386,272.

(51) Int. Cl.
*H04L 29/06* (2006.01)
*H04N 7/15* (2006.01)
(Continued)

(52) U.S. Cl.
CPC ............ *H04L 65/403* (2013.01); *G06F 3/013* (2013.01); *G06K 9/0061* (2013.01);
(Continued)

(58) Field of Classification Search
CPC combination set(s) only.
See application file for complete search history.

(56) References Cited

U.S. PATENT DOCUMENTS 6,356,303 B1 * 3/2002 Shibata .................. H04N 5/232
348/211.1
8,670,018 B2 3/2014 Cunnington et al.
(Continued)

FOREIGN PATENT DOCUMENTS

CN 1551632 12/2004
CN 102170552 8/2011
(Continued)

OTHER PUBLICATIONS

International Search Report for International Patent Application PCT/US2015/032567, dated Sep. 7, 2015, 3 pages.
(Continued)

*Primary Examiner* — Phung-Hoang J Nguyen
(74) *Attorney, Agent, or Firm* — Barnes & Thornburg LLP

(57) ABSTRACT

Technologies for audiovisual communication include an audiovisual server and a number of audiovisual client devices, including a presenter device and a number of audience devices. Each audience device captures an audiovisual stream and transmits the audiovisual stream to the audiovisual server. Each audience device also captures sensor input data such as eye tracking data or facial expression data and transmits abstracted sensor input data to the audiovisual server. The abstracted sensor input data may be based on the captured audiovisual stream. The audiovisual server determines an interestingness rating associated with each audience device based on the sensor input data, and selects one or more audiovisual streams based on the interestingness ratings. The audiovisual server transmits the selected audiovisual streams to the presenter device. The audiovisual server may update the interestingness rating algorithm based on feedback from the presenter device or the audience devices. Other embodiments are described and claimed.

10 Claims, 4 Drawing Sheets

(51) Int. Cl.
    *H04N 5/265*    (2006.01)
    *G06K 9/00*     (2006.01)
    *H04N 7/14*     (2006.01)
    *G06F 3/01*     (2006.01)
(52) U.S. Cl.
    CPC ...... *G06K 9/00335* (2013.01); *G06K 9/00711* (2013.01); *H04L 65/1083* (2013.01); *H04N 5/265* (2013.01); *H04N 7/147* (2013.01); *H04N 7/15* (2013.01); *H04N 7/152* (2013.01); *H04L 67/42* (2013.01)

(56) References Cited

U.S. PATENT DOCUMENTS

| | | | |
|---|---|---|---|
| 8,866,943 | B2 | 10/2014 | Park et al. |
| 8,873,851 | B2 | 10/2014 | Fedorovskaya et al. |
| 9,131,053 | B1* | 9/2015 | Tan .................. H04M 3/5175 |
| 2002/0101505 | A1 | 8/2002 | Gutta et al. |
| 2004/0230651 | A1 | 11/2004 | Ivashin |
| 2006/0287070 | A1* | 12/2006 | Walker ................ G07F 17/3234 463/25 |
| 2011/0072037 | A1* | 3/2011 | Lotzer ............... G06F 17/30855 707/769 |
| 2011/0205330 | A1 | 8/2011 | Liu |
| 2011/0295392 | A1* | 12/2011 | Cunnington .......... G06Q 10/10 700/90 |
| 2012/0122476 | A1* | 5/2012 | Lee ........................ H04W 4/02 455/456.1 |
| 2012/0194631 | A1 | 8/2012 | Venolia et al. |
| 2012/0221960 | A1* | 8/2012 | Robinson .............. G06F 3/0488 715/751 |
| 2012/0296914 | A1 | 11/2012 | Romanov |
| 2012/0306993 | A1 | 12/2012 | Sellers-Blais |
| 2013/0198629 | A1* | 8/2013 | Tandon ................. H04M 3/567 715/716 |
| 2013/0330055 | A1* | 12/2013 | Zimmermann .... H04N 21/2743 386/240 |
| 2014/0003716 | A1 | 1/2014 | Fedorovskaya et al. |
| 2014/0091897 | A1* | 4/2014 | Lemmey ................ A61B 5/165 340/3.1 |
| 2015/0154445 | A1 | 6/2015 | Biswas et al. |

FOREIGN PATENT DOCUMENTS

| | | |
|---|---|---|
| CN | 103548339 | 1/2014 |
| JP | 2003-304337 | 10/2003 |
| JP | 2006-338493 | 12/2006 |
| JP | 2010-141843 | 6/2010 |
| JP | 2010141843 | 6/2010 |
| JP | 4585380 | 11/2010 |
| JP | 2011228817 | 11/2011 |

OTHER PUBLICATIONS

Written Opinion for International Patent Application PCT/US2015/032567, dated Sep. 7, 2015, 10 pages.
Extended European search report dated Feb. 8, 2018 for European Patent Application No. 15811325.8-1230, 12 pages.
First Office action in Chinese patent application No. 201580027953.x, dated Nov. 1, 201 (34 pages).
Second Office action in Chinese patent application No. 201580027953.x, dated May 17, 2019, including machine translation (31 pages).

* cited by examiner

TECHNOLOGIES FOR AUDIOVISUAL COMMUNICATION USING INTERESTINGNESS ALGORITHMS

CROSS-REFERENCE TO RELATED APPLICATION

This application is a continuation application of U.S. application Ser. No. 14/317,607, entitled "TECHNOLOGIES FOR AUDIOVISUAL COMMUNICATION USING INTERESTINGNESS ALGORITHMS," which was filed on Jun. 27, 2014.

BACKGROUND

Video teleconferencing is a popular application for modern computing devices, allowing globally distributed individuals to work, learn, and socialize together. Compared to audio or text communication technologies, video communication may provide better opportunities for visual cues and other important human interactions. Typical video teleconferencing systems may identify which party to a teleconference is speaking based on audio levels of the transmitted signal. When displaying the parties, the speaker may be enlarged or otherwise emphasized, and other parties to the teleconference may be displayed uniformly or otherwise deemphasized. For teleconferences with a large number of participants such as presentations, each party other than the speaker may be difficult to view in detail or otherwise interact with.

Interestingness is a concept used in the field of data mining and knowledge discovery. Processing large amounts of data may involve applying data mining algorithms to identify patterns within the data and then focusing further analysis only on "interesting" patterns among those identified. Interestingness is thus a measure of which patterns identified within the data are interesting. In particular, an interestingness measure may indicate the relevance, accuracy, or representativeness of a particular pattern in relation to a data set. Various techniques and algorithms for measuring interestingness are surveyed in Sigal Sahar, *Interestingness Measures: On Determining What Is Interesting*, in Data Mining and Knowledge Discovery Handbook (Oded Maimon & Lior Rokach eds., 2d ed. 2010).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
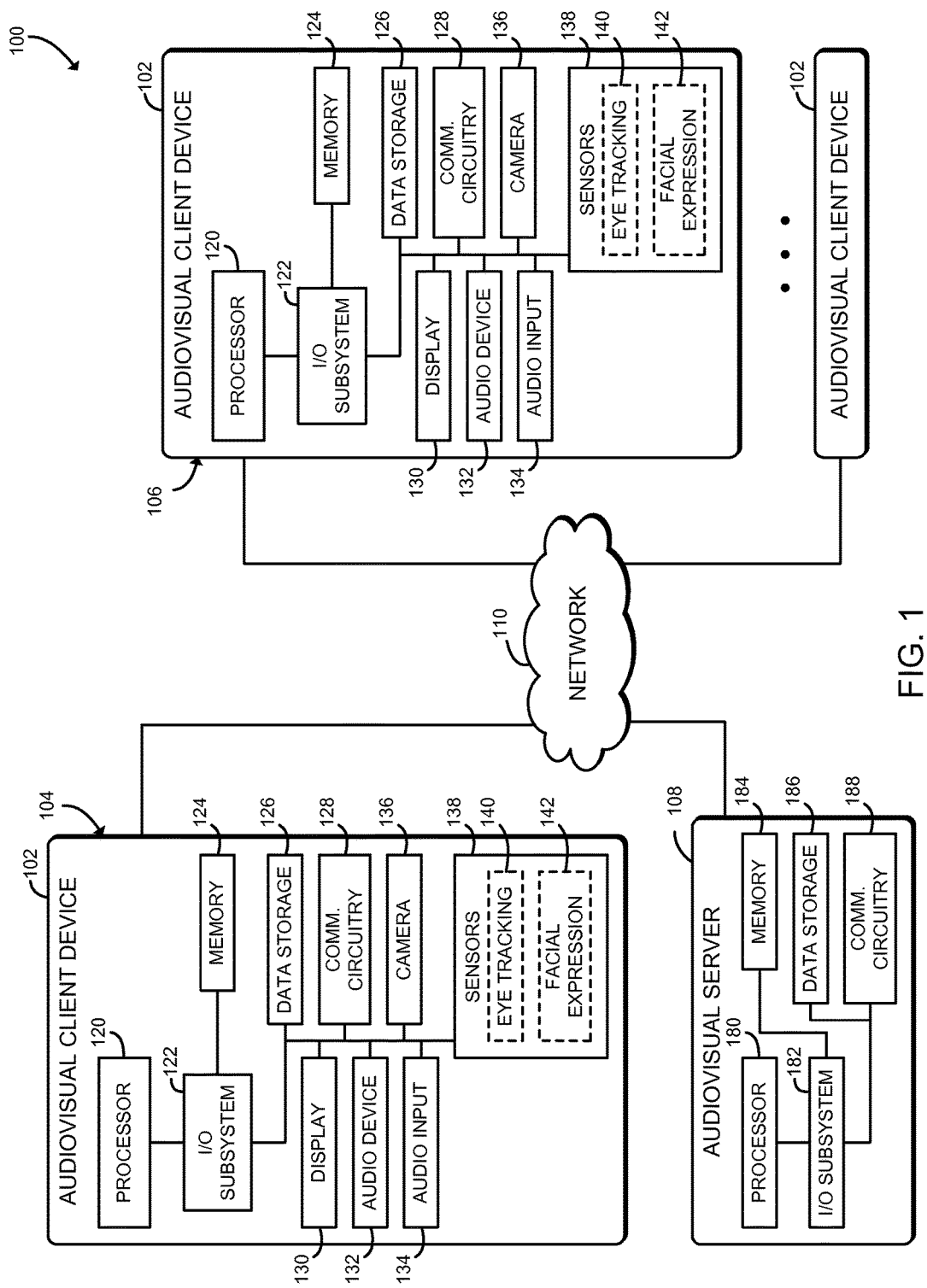
FIG. 1 is a simplified block diagram of at least one embodiment of a system for audiovisual communication.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for video conferencing includes a number of audiovisual client devices 102 and an audiovisual server 108 capable of communication over a network 110. The audiovisual client devices 102 further may be classified by role into an audiovisual presenter device 104 and a number of audiovisual audience devices 106. In use, as described below, each of the audiovisual client devices 102 captures an audiovisual stream and transmits the audiovisual stream to the audiovisual server 108. Each of the audiovisual client devices 102 also captures sensor input data and transmits the sensor input data to the audiovisual server 108. The audiovisual server 108 generates an interestingness rating based on the incoming sensor input data for each of the audiovisual audience devices 106, and selects one or more audiovisual streams corresponding to audiovisual audience devices 106 having high interestingness ratings. The audiovisual server 108 transmits the selected audiovisual streams to the audiovisual presenter device 104. The audiovisual server 108 may refine or otherwise improve the interestingness rating algorithm based on sensor input data received from the audiovisual presenter device 104 and/or the audiovisual audience devices 106. In some embodiments, the audiovisual server 108 may transmit an audiovisual stream received from the audiovisual presenter device 104 to each of the audiovisual audience devices 106.

Thus, the audiovisual presenter device 104 may display audiovisual streams from a relatively small number of interesting audiovisual audience devices 106, allowing the presenter to view those audience members in greater detail. Thus, the presenter may become aware of visual and/or other nonverbal cues displayed by some audience members and adjust the presentation accordingly. For example, the presenter may be able to gauge audience sentiment more readily, identify engaged or disengaged audience members, or otherwise improve the quality of the presentation.

Each audiovisual client device 102 may be embodied as any type of device for performing the functions described herein. For example, each audiovisual client device 102 may be embodied as, without limitation, a smartphone, a tablet computer, a laptop computer, a notebook computer, a mobile computing device, a wearable computing device, a cellular telephone, a handset, a messaging device, a vehicle telematics device, a server computer, a desktop computer, a workstation, a distributed computing system, a multiprocessor system, a consumer electronic device, and/or any other computing device configured to perform the functions described herein. The illustrative audiovisual client devices 102 include a processor 120, an input/output subsystem 122, a memory 124, and a data storage device 126. Of course, each audiovisual client device 102 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the audiovisual client device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the audiovisual client device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the audiovisual client device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store audiovisual data or sensor input data captured by the audiovisual client device 102, or audiovisual data to be presented by the audiovisual client device 102.

Each audiovisual client device 102 further includes a communication circuit 128, which may be embodied as any communication circuit, device, or collection thereof, capable of enabling communications between the audiovisual client devices 102, the audiovisual server 108, and/or other remote devices. The communication circuit 128 may be configured to use any one or more communication technology (e.g., wireless or wired communications) and associated protocols (e.g., Ethernet, Bluetooth®, Wi-Fi®, WiMAX, etc.) to effect such communication. The communication circuit 128 may be embodied as a network adapter, including a wireless network adapter.

In the illustrative embodiment, each audiovisual client device 102 further includes a display 130, audio device 132, audio input 134, camera 136, and a number of sensors 138. The display 130 of the audiovisual client device 102 may be embodied as any type of display capable of displaying digital information such as a liquid crystal display (LCD), a light emitting diode (LED), a plasma display, a cathode ray tube (CRT), or other type of display device. In some embodiments, the display 130 may be coupled to a touch screen to allow user interaction with the audiovisual client device 102. The audio device 132 may be embodied as any device capable of generating audio signals for output, such as a paper cone speaker, an audio transducer, an audio output jack, a digital-to-analog converter (DAC), or other type of audio device.

The audio input 134 may be embodied as any sensor capable of capturing audio signals such as a microphone, a line input jack and associated circuitry, an analog-to-digital converter (ADC), or other type of audio sensor. The camera 136 may be embodied as a digital camera or other digital imaging device integrated with the audiovisual client device 102 or otherwise communicatively coupled thereto. The camera 136 includes an electronic image sensor, such as an active-pixel sensor (APS), e.g., a complementary metal-oxide-semiconductor (CMOS) sensor, or a charge-coupled device (CCD). The camera 136 may be used to capture still or video images of the environment of the audiovisual client device 102, including, in some embodiments, capturing the user of the audiovisual client device 102. For example, the camera 136 of the audiovisual presenter device 104 may capture the presenter, and the camera 136 of each audiovisual audience device 106 may capture an audience member. Thus, in some embodiments the audio input 134 and the camera 136 may cooperate to capture an audiovisual stream suitable for videoconferencing.

The sensors 138 are capable of generating sensor input data indicative of the environment of the audiovisual client device 102. Accordingly, the sensors 138 may be capable of detecting sensor input data relating to the state of a user of the audiovisual client device 102, including the user's attention level, presence, or other indication of engagement with the audiovisual client device 102. In some embodiments, the sensors 138 may include, be coupled to, or be embodied as other components of the audiovisual client device 102, such as the audio input 134 and/or the camera 136. In some embodiments, the sensors 138 may include an eye tracking sensor 140 and a facial expression sensor 142. Additionally or alternatively, the sensors 138 may include wearable devices, biometric devices, and other devices capable of measuring the state of the user.

The eye tracking sensor 140 may be embodied as any one or more active or passive sensors capable of determining a direction in which the user's gaze is directed. For example, in some embodiments, the eye tracking sensor 140 may use active infrared emitters and infrared detectors to track the viewer's eye movements over time. The eye tracking sensor 140 may capture the infrared light reflected off of various internal and external features of the viewer's eye and thereby calculate the direction of the viewer's gaze. In other embodiments, the eye tracking sensor 140 may be embodied as a video camera capable of recording the user's eye motion. In some embodiments, the eye tracking sensor 140 may gather eye tracking data for both of the user's eyes to improve tracking accuracy. In those embodiments, the eye tracking sensor 140 may use more than one active or passive sensor components to track both of the user's eyes. Additionally or alternatively, in some embodiments the eye tracking sensor 140 may perform three-dimensional eye tracking, which tracks both the gaze direction of the user's eye along with the distance at which the user's eye is focused. For example, the eye tracking sensor 140 may determine a viewing angle for both of the user's eyes, allowing the distance to the object to be calculated.

In some embodiments, the sensors 138 may include the facial expression sensor 142. The facial expression sensor 142 is capable of detecting and classifying facial expressions of the user of the audiovisual client device 102. For example, the facial expression sensor 142 may analyze data from the camera 136 and/or other sensors 138 to determine the facial expressions. The facial expression sensor 142 may be embodied as hardware, firmware, software, or any other component of the audiovisual client device 102 capable of analyzing facial expressions. Additionally or alternatively the sensors 138 may include other sensors to supplement or substitute for the eye tracking sensor 140 and/or the facial expression sensor 142. For example, the sensors 138 may include a temperature sensor that may be used, for example, to help determine the user's mood, in some embodiments in connection with a detected facial expression.

The audiovisual server 108 may be embodied as any type of device for processing audiovisual streams as described herein. For example, the audiovisual server 108 may be embodied as, without limitation, a server computer, a workstation, a desktop computer, a smart phone, a tablet computer, a laptop computer, a notebook computer, a mobile computing device, a cellular telephone, a handset, a messaging device, a vehicle telematics device, a distributed computing system, a multiprocessor system, a consumer electronic device, and/or any other computing device configured to perform the functions described herein. Further, the audiovisual server 108 may be embodied as a single server computing device or a collection of servers and associated devices. For example, in some embodiments, the audiovisual server 108 is embodied as a cloud service to perform the functions described herein. In such embodiments, the audiovisual server 108 may be embodied as a "virtual server" formed from multiple computing devices distributed across the network 110 and operating in a public or private cloud. Accordingly, although the audiovisual server 108 is illustrated in FIG. 1 and described below as embodied as single server computing device, it should be appreciated that the audiovisual server 108 may be embodied as multiple devices cooperating together to facilitate the functionality described below.

As shown in FIG. 1, the illustrative audiovisual server 108 may include components and features similar to the audiovisual client devices 102, such as a processor 180, I/O subsystem 182, memory 184, data storage 186, communication circuitry 188, and various peripheral devices. Those individual components of the audiovisual server 108 may be similar to the corresponding components of each audiovisual client device 102, the description of which is applicable to the corresponding components of the audiovisual server 108 and is not repeated for clarity of the present description.

Figure 2:
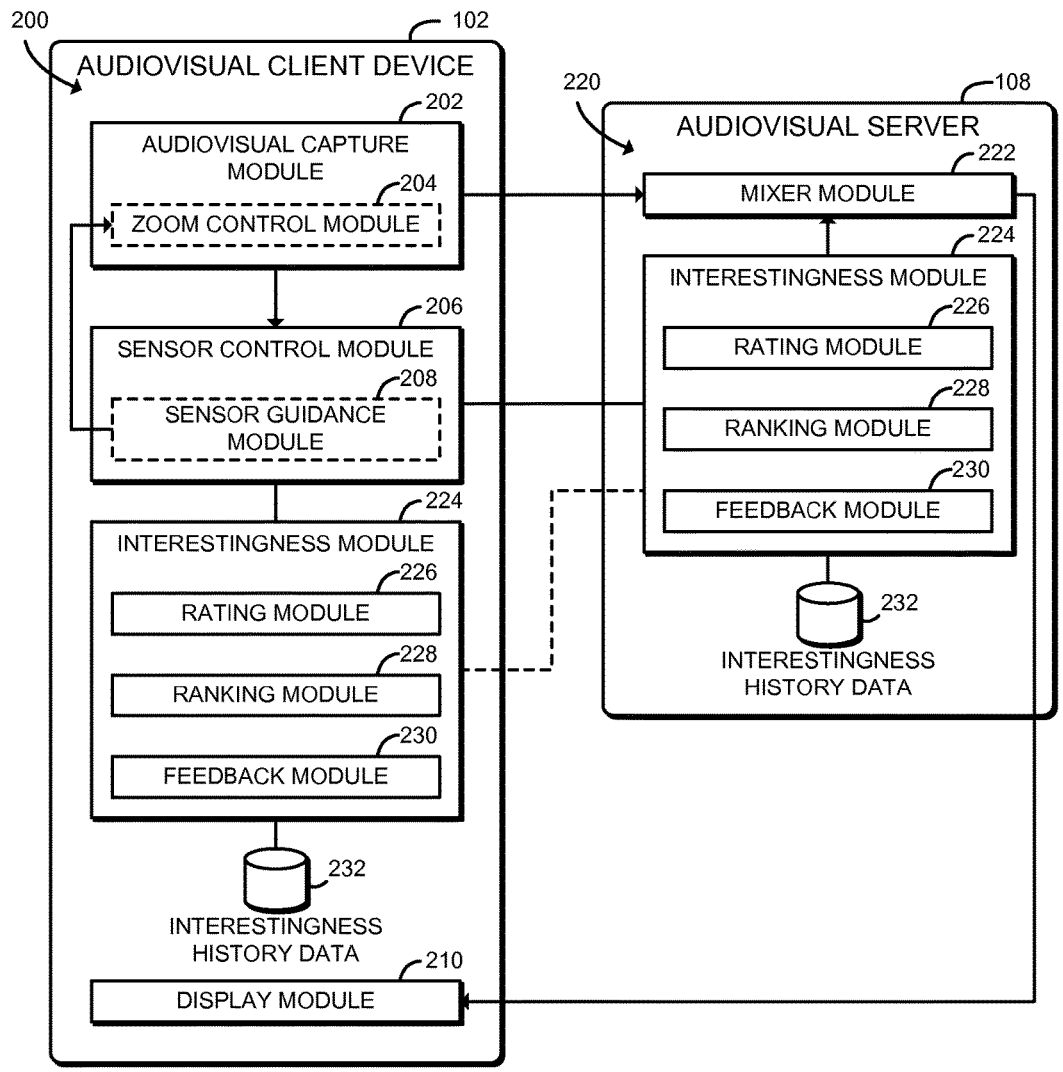
FIG. 2 is a simplified block diagram of at least one embodiment of various environments that may be established by the system of FIG. 1.

Referring now to FIG. 2, in some embodiments each audiovisual client device 102 establishes an environment 200 during operation. The illustrative environment 200 includes an audiovisual capture module 202, a sensor control module 206, and a display module 210. In some embodiments, the environment 200 may also include an interestingness module 224, described below. The various modules of the environment 200 may be embodied as hardware, firmware, software, or a combination thereof.

The audiovisual capture module 202 is configured to capture one or more audiovisual streams. For example, the audiovisual capture module 202 may use the camera 136 and the audio input 134 to record a video stream of the user of the audiovisual client device 102. The audiovisual streams are provided to the sensor control module 206 and to the audiovisual server 108, as described below. In some embodiments, the audiovisual capture module 202 may be configured to zoom or otherwise focus the audiovisual stream. As described below, the audiovisual client device 102 may receive instructions to focus the audiovisual stream on a particular subject from the audiovisual server 108. In some embodiments, those functions may be performed by a submodule, for example by a zoom control module 204.

The sensor control module 206 is configured to capture sensor input data from the sensors 138, and to analyze and regulate the captured sensor input data. The sensor control module 206 may also capture, correlate, or otherwise receive captured audiovisual streams from the audiovisual capture module 202. The sensor control module 206 may filter, process, or otherwise transform the sensor input data into a format that may be used for additional analysis. For example, the sensor control module 206 may generate sensor data at a higher level of abstraction suitable for further analysis. The regulated sensor input data may be provided to the audiovisual server 108 and/or, in some embodiments, the interestingness module 224 of the audiovisual client device 102. In some embodiments, the sensor control module 206 may be configured to focus, guide, or otherwise direct the sensors 138 and/or the audiovisual capture module 202 to focus on a particular subject. As described below, the audiovisual client device 102 may receive instructions to focus the sensor input data on a particular subject from the audiovisual server 108. In some embodiments, those functions may be performed by a submodule, for example by a sensor guidance module 208.

The display module 210 is configured to receive one or more selected audiovisual streams from the audiovisual server 108 and to display the selected audiovisual streams. The audiovisual streams may be selected based on an interestingness rating determined by the audiovisual server 108 and/or the interestingness module 224 of the audiovisual client device 102, as described below. The particular audiovisual streams selected may depend on the role of each audiovisual client device 102; for example, the audiovisual audience devices 106 may each receive an audiovisual stream from the audiovisual presenter device 104, and the audiovisual presenter device 104 may receive one or more audiovisual streams from audiovisual audience devices 106 having high interestingness ratings.

Still referring to FIG. 2, in some embodiments, the audiovisual server 108 establishes an environment 220 during operation. The illustrative environment 220 includes a mixer module 222 and an interestingness module 224. The various modules of the environment 220 may be embodied as hardware, firmware, software, or a combination thereof.

The interestingness module 224 is configured to determine an interestingness rating associated with an audiovisual client device 102 based on the associated sensor input data and/or audiovisual streams. In some embodiments, interestingness ratings may be determined for the audiovisual audience devices 106 and not the audiovisual presenter device 104. The interestingness rating may provide an indication of the relevance, accuracy, or representativeness of the associated audiovisual stream. The interestingness module 224 is further configured to rank the audiovisual client devices 102 based on interestingness. Additionally, the interestingness module 224 is configured to update the interestingness algorithm based on feedback received from the audiovisual client devices 102. The interestingness module 224 may maintain interestingness history data 232 that may be used to update the interestingness algorithm. In some embodiments, those functions may be performed by one or more sub-modules, for example by a rating module 226, a ranking module 228, or a feedback module 230.

As described above, in some embodiments the environment 200 may also include the interestingness module 224 and/or the interestingness history data 232. In those embodiments, the interestingness module 224 may perform the same functions in both the environment 200 and the environment 220. Additionally or alternatively, the functions of the interestingness module 224 may be partially or completely shared or otherwise distributed between the environment 200 and the environment 220.

The mixer module 222 is configured to receive audiovisual streams from the audiovisual client devices 102. The mixer module 222 is also configured to select one or more audiovisual streams for each of the audiovisual client devices 102 based on the interestingness ratings and to transmit the selected audiovisual streams to the appropriate audiovisual client devices 102. For example, the mixer module 222 may transmit an audiovisual stream received from the audiovisual presenter device 104 to each of the audiovisual audience devices 106, and may transmit one or more audiovisual streams received from audiovisual audience devices 106 having high interestingness ratings to the audiovisual presenter device 104.

Figure 3:
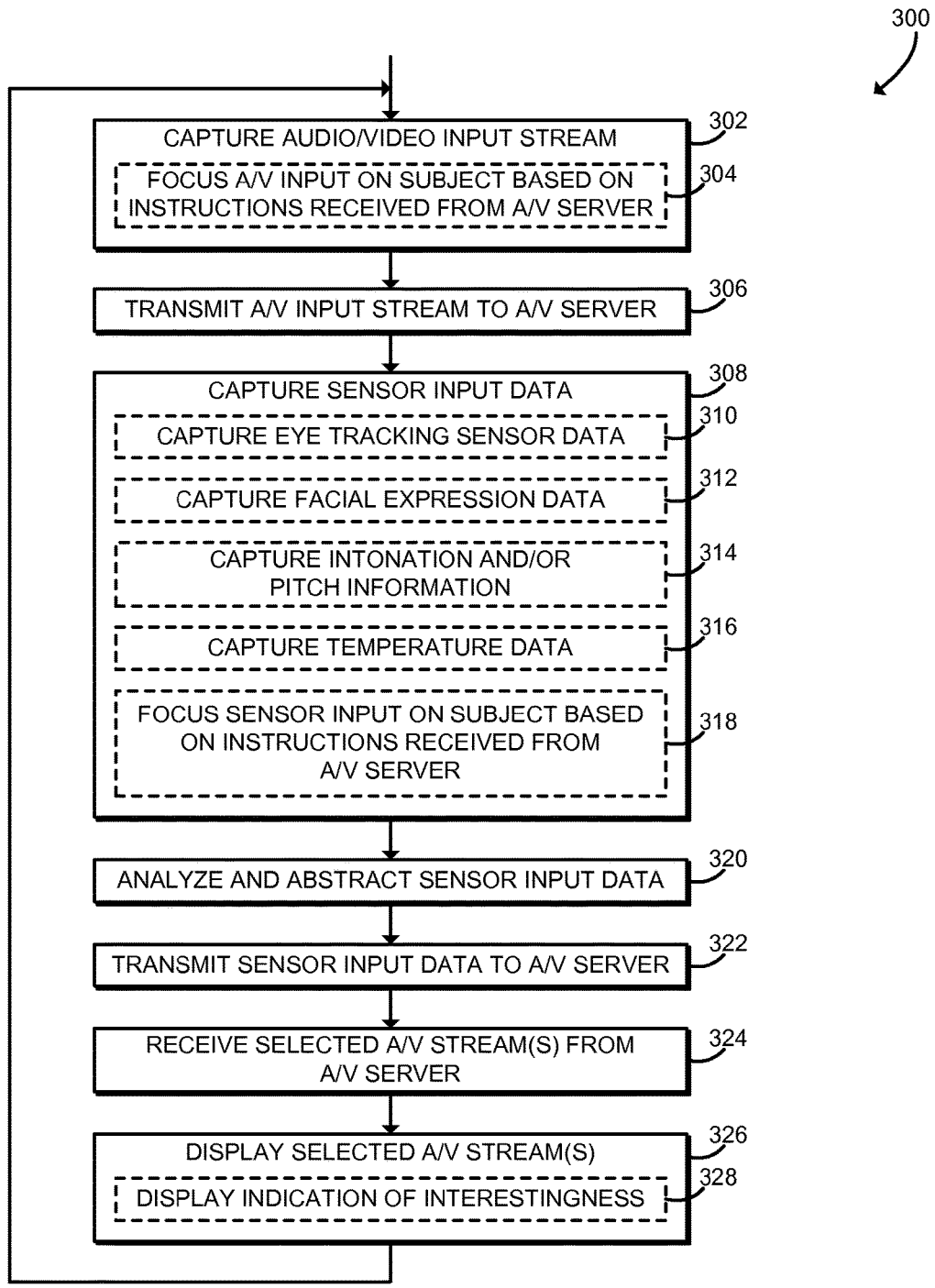
FIG. 3 is a simplified flow diagram of at least one embodiment of a method for capturing and displaying audiovisual streams that may be executed by an audiovisual client device of FIGS. 1 and 2.

Referring now to FIG. 3, in use, each audiovisual client device 102 may execute a method 300 for audiovisual communication. The method 300 may be performed by either the audiovisual presenter device 104 or any of the audiovisual audience devices 106. The various processes of the method 300 may be performed in different orders in some embodiments. The method 300 begins in block 302, in which the audiovisual client device 102 captures an audiovisual input stream. The audiovisual stream may be embodied in any format suitable for network transmission and/or display. The audiovisual stream may be captured using the camera 136 and the audio input 134. In some embodiments, in block 304 the audiovisual client device 102 may focus on a subject based on instructions received from the audiovisual server 108. The audiovisual client device 102 may perform any technique to focus, direct, or otherwise improve the quality of the captured audiovisual stream in relation to the specified subject. For example, the audiovisual client device 102 may focus, zoom, or otherwise direct the camera 136 toward an identified speaker in order to enlarge or improve the quality of the captured audiovisual stream.

In block 306, the audiovisual client device 102 transmits the captured audiovisual input stream to the audiovisual server 108. As described below, the audiovisual input stream may be further transmitted to one or more other audiovisual client devices 102. In some embodiments, the audiovisual client device 102 may transmit additional or alternative audiovisual streams. For example, an audiovisual presenter device 104 may also transmit a slideshow, screen capture, presentation notes, or other supplemental content to the audiovisual server 108.

In block 308, the audiovisual client device 102 captures sensor input data using the sensors 138. The sensor input data may be indicative of the state of a user of the audiovisual client device 102 (e.g., the presenter or an audience member) or, in some embodiments, of the general environment of the audiovisual client device 102 (e.g., background noise). For example, the sensor input data may be indicative of the user's facial expression such as whether the user is smiling, eye tracking information associated with the user, an emotional reaction of the user, or any other parameter of the state of the user. Additionally or alternatively, in some embodiments the audiovisual client device 102 may capture sensor data indicative of the state of several users that are all using the same audiovisual client device 102. In some embodiments, in block 310, the audiovisual client device 102 may capture eye tracking sensor data from the eye tracking sensors 140. The eye tracking sensor data may be indicative of the direction of the user's gaze. For example, the eye tracking sensor data may indicate that the user's gaze is directed at a particular point on the display 130 and thus at a particular audiovisual stream displayed at that point. Additionally or alternatively, the eye tracking sensor data may indicate whether the user's gaze is directed at the display 130 or directed elsewhere. In some embodiments, in block 312, the audiovisual client device 102 may capture facial expression data using the facial expression sensors 142. Of course in some embodiments, the audiovisual client device 102 may capture the facial expression data using the camera 136 without the use of a distinct facial expression sensor 142. In some embodiments, in block 314, the audiovisual client device 102 may capture intonation and/or pitch information relating to the speech of the user. The audiovisual client device 102 may capture the intonation and/or pitch information using the audio input 134 or any other audio input and processing components. In some embodiments, in block 316, the audiovisual client device 102 may capture temperature data. The temperature level may be indicative of the temperature of the user of the audiovisual client device 102 and may thus also be indicative of the mood, alertness, or other attributes of the user. The temperature data may be captured using a temperature sensor, thermal imager, biometric device, or any other device capable of determining temperature.

In some embodiments, in block 318, the audiovisual client device 102 may focus the sensors 138 on a subject based on instructions received from the audiovisual server 108. Similar to focusing the audiovisual input stream, the audiovisual client device 102 may perform any technique to focus, direct, or otherwise improve the quality of the sensor input data relation to the specified subject. For example, the audiovisual client device 102 may focus, zoom, or otherwise direct the eye tracking sensors 140 toward an identified speaker in order to enlarge or improve the quality of the sensor input data.

After capturing the sensor input data, in block 320 the audiovisual client device 102 analyzes and abstracts the sensor input data. The audiovisual client device 102 may filter, process, or otherwise transform the sensor input data into abstracted sensor input data that may be used by the audiovisual server 108, as described below. The abstracted sensor input data may be embodied as a representation of the sensor input data that is smaller in size, at a higher granularity, or at a higher level abstraction. For example, in some embodiments, the audiovisual client device 102 may process raw sensor input data and generate sensor data at a higher level of abstraction suitable for further analysis. For example, the audiovisual client device 102 may smooth or otherwise filter eye tracking sensor data to remove high-frequency eye movements. In some embodiments, the audiovisual client device 102 may process raw video data to generate data indicative of facial expressions, for example, data describing the position of the user's facial features, or symbolic representations of facial expressions (e.g., smile, frown, confusion, interest, etc.).

In block 322, the audiovisual client device 102 transmits the regulated sensor input data to the audiovisual server 108 for analysis, as described further below. In some embodiments, as described below, the sensor input data may be used by the audiovisual server 108 to determine an interestingness level associated with the audiovisual client device 102. For example, the audiovisual server 108 may analyze sensor input data received from the audiovisual audience devices 106 to rank the audiovisual audience devices 106 in order of interestingness. Additionally or alternatively, in some embodiments the sensor input data may be used by the audiovisual server 108 as feedback to improve its interestingness algorithm. As another example, the audiovisual server 108 may analyze sensor input data received from the audiovisual presenter device 104 to determine whether the user's attention level is consistent with the interestingness ranking assigned to each selected audiovisual stream.

In block 324, the audiovisual client device 102 receives one or more selected audiovisual streams from the audiovisual server 108. Each of the audiovisual streams may originate from a different audiovisual client device 102. For example, the audiovisual presenter device 104 may receive one or more audiovisual streams corresponding to audiovisual audience devices 106 having relatively high interestingness ratings. Accordingly, each audiovisual audience device 106 may receive an audiovisual stream originating from the audiovisual presenter device 104. In some embodiments, the selected audiovisual stream may be one of several audiovisual streams originating from the audiovisual presenter device 104 (e.g., a video feed, slideshow stream, screen capture stream, presentation notes, or other alternate audiovisual stream).

In block 326, the audiovisual client device 102 displays the selected audiovisual streams on the display 130. The audiovisual client device 102 may display the audiovisual streams in any suitable format, including tiling the audiovisual streams, cascading the audiovisual streams, or sequentially displaying the audiovisual streams. In some embodiments, in block 328 the audiovisual client device 102 may display an indication of the interestingness rating associated with the audiovisual stream and/or its associated audiovisual client device 102. For example, the audiovisual client device 102 may superimpose a visual indicator of interestingness such as a bar code, color-coding, or numerical display on the audiovisual stream. As another example, the audiovisual client device 102 may emphasize particular audiovisual streams based on interestingness, for example by displaying the most interesting audiovisual stream with the largest size or in the center of the display 130. After displaying the selected audiovisual streams, the method 300 loops back to block 302 to continue capturing the audiovisual stream.

Figure 4:
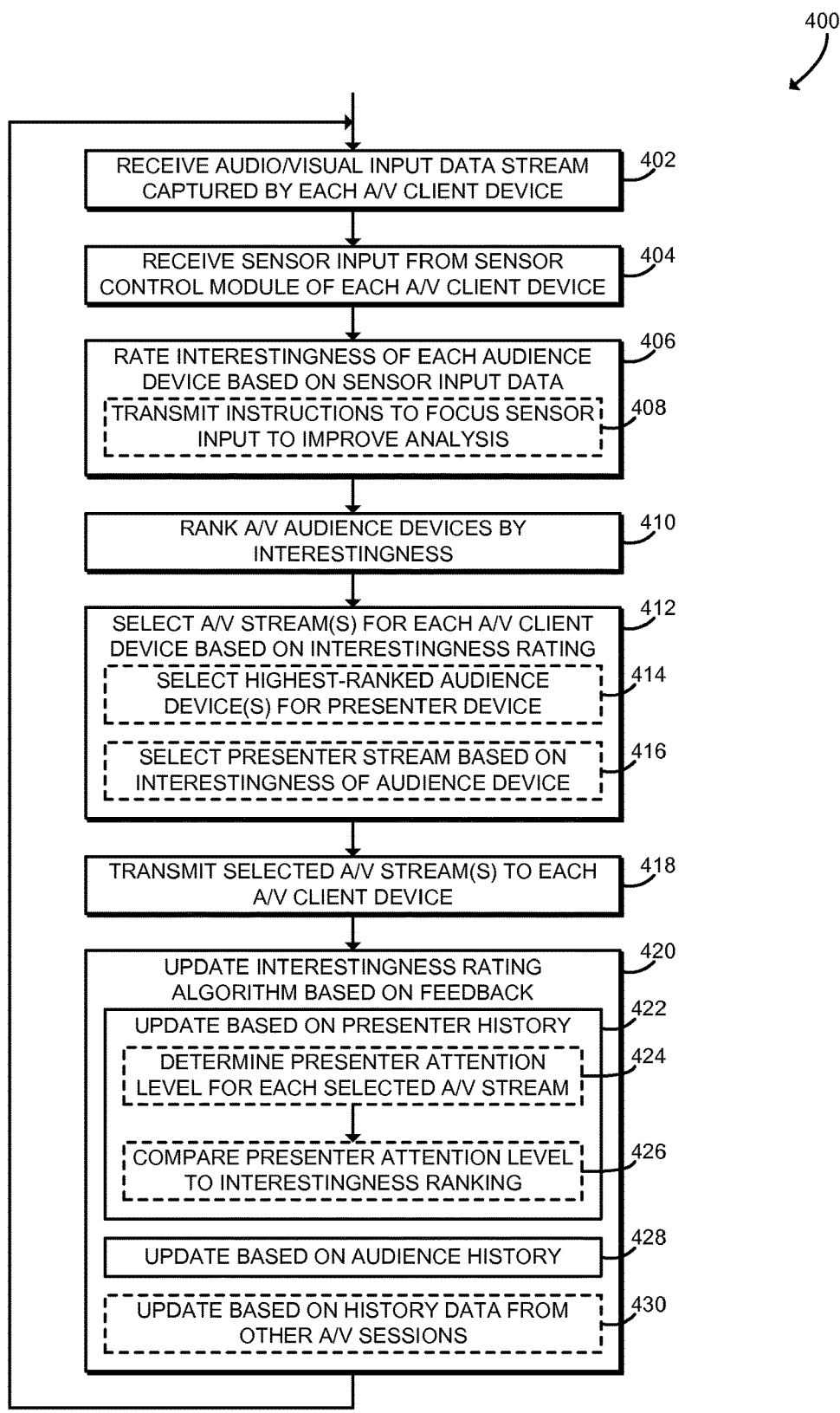
FIG. 4 is a simplified flow diagram of at least one embodiment of a method for analyzing, selecting, and transmitting audiovisual streams that may be executed by an audiovisual server of FIGS. 1 and 2.

Referring now to FIG. 4, in use, the audiovisual server 108 may execute a method 400 for audiovisual communication. The method 400 begins with block 402, in which the audiovisual server 108 receives an audiovisual stream captured by each of the audiovisual client devices 102. The audiovisual stream may include, for example, a video feed captured by the camera 136 and the audio input 134 of the audiovisual client device 102. Additionally or alternatively, the audiovisual server 108 may receive additional or alternative audiovisual streams from the audiovisual client devices 102. For example, the audiovisual server 108 may also receive a slideshow, screen capture, presentation notes, or other supplemental content from the audiovisual presenter device 104.

In block 404, the audiovisual server 108 receives sensor input data from the sensor control module 206 of each audiovisual client device 102. As described above, the sensor input data may include eye tracking data, facial expression data, intonation or pitch data, temperature data, or any other sensor data indicative of the environment of the audiovisual client device 102 or the user of the audiovisual client device 102.

In block 406, the audiovisual server 108 rates an interestingness value associated with each of the audiovisual audience devices 106. The interestingness value may represent how interesting the particular audiovisual stream associated with the audiovisual audience device 106 is predicted to be for the user of the audiovisual presenter device 104. The interestingness value thus may represent a determination of the accuracy, relevance, or representativeness of the particular audiovisual audience device 106. For example, a high interestingness value may indicate whether the associated audience member is attentive, excited, or otherwise engaged with the presenter, and a low interestingness value may indicate that the audience member is distracted, absent, or otherwise not engaged. As another example, a high interestingness value may indicate that the audience member is highly representative of other audience members (i.e., the audience member displays the same level of engagement as many other audience members). As still another example, interestingness values may indicate whether the audiovisual stream is relevant to the presentation (e.g., audiovisual streams including loud background noise may not be relevant). Additionally or alternatively, the audiovisual server 108 may determine an interestingness value for multiple audience members using a single audiovisual audience device 106. The audiovisual server 108 may use any interestingness algorithm to determine the interestingness value, including subjective interestingness algorithms, objective interestingness algorithms, impartial interestingness algorithms, or any other interestingness algorithm.

In some embodiments, in block 408 the audiovisual server 108 may transmit instructions to one or more audiovisual client devices 102 to focus the sensor input data to improve the interestingness analysis. For example, the audiovisual server 108 may determine that the confidence level associated with a particular interestingness value is low, or that the interestingness value may otherwise be improved with better sensor input data. If the sensor input data may be improved, the audiovisual server 108 may generate instructions to focus the sensor input.

Although illustrated as occurring on the audiovisual server 108, in some embodiments the interestingness rating may be generated entirely or partially on one or more of the audiovisual client devices 102. For example, each audiovisual client device 102 may entirely or partially determine its own interestingness rating and submit that interestingness rating (or partial interestingness rating) to the audiovisual server 108.

In block 410, the audiovisual server 108 ranks the audiovisual audience devices 106 by their associated interestingness ratings. The audiovisual server 108 may use any appropriate ranking. For example, the audiovisual server 108 may rank the audiovisual audience devices 106 in ascending or descending order.

In block 412, the audiovisual server 108 selects one or more audiovisual streams for transmission to each audiovisual client device 102 based on the associated interestingness rating. In some embodiments, in block 414, the audiovisual server 108 may select one or more audiovisual streams associated with the highest-ranking audiovisual audience devices 106 for transmission to the audiovisual presenter device 104. Selecting the audiovisual audience devices 106 with the highest interestingness rating may allow the presenter to view the most accurate, relevant, or representative audiovisual streams from the audiovisual audience devices 106. Additionally or alternatively, in some embodiments the audiovisual server 108 may select one or more audiovisual streams associated with the lowest-ranking audiovisual audience devices 106 (not shown). For example, selecting the audiovisual audience devices 106 with the lowest interestingness rating may allow an instructor to monitor audience members that are confused, inattentive, or otherwise not engaged with the presentation.

In some embodiments, in block 416, the audiovisual server 108 may select a presenter stream based on the interestingness rating associated with each of the audiovisual audience devices 106. For example, as discussed above, the interestingness rating associated with the audiovisual audience device 106 may indicate that the audience member is confused, inattentive, or disengaged. In those circumstances, the audiovisual server 108 may select an alternative or supplemental presenter stream (e.g., a slideshow, screen capture, presentation notes, or other stream) for transmission to the audiovisual audience device 106.

In block 418, the audiovisual server 108 transmits the selected audiovisual streams to each of the audiovisual client devices 102. As described above, the audiovisual server 108 may transmit one or more audiovisual streams to the audiovisual presenter device 104 that are associated with the audiovisual audience devices 106 having the highest interestingness ratings. Further, the audiovisual server 108 may transmit one or more audiovisual streams from the audiovisual presenter device 104 to each of the audiovisual audience devices 106.

In block 420, the audiovisual server 108 updates the interestingness rating algorithm based on feedback received from the audiovisual client devices 102. The audiovisual server 108 may store historical interestingness data, including previous interestingness rankings and associated sensor input data, for use in updating the interestingness rating algorithm.

In block 422, the audiovisual server 108 updates the interestingness algorithm based on historical interestingness data associated with the presenter. The audiovisual server 108 may analyze the sensor input data and/or audiovisual streams originating from the audiovisual presenter device 104 to determine whether the presenter agrees with the interestingness ratings determined by the interestingness algorithm. In some embodiments, in block 424, the audiovisual server 108 may determine an attention level of the presenter associated with each selected A/V stream. For example, the audiovisual server 108 may analyze eye tracking sensor data from the audiovisual presenter device 104 to determine the presenter directed his or her gaze at a selected audiovisual stream. Next, in block 426, in those embodiments the audiovisual server 108 may compare the determined presenter attention level with the interestingness ranking associated with each selected audiovisual stream. For example, the audiovisual server 108 may determine that the presenter primarily focused his or her gaze on a particular audiovisual stream, but that the particular audiovisual stream was ranked lower than other audiovisual streams. The audiovisual server 108 may update the interestingness rating algorithm based on that comparison.

In block 428, the audiovisual server 108 updates the interestingness algorithm based on historical interestingness data associated with the audience members. For example, the interestingness algorithms may be adjusted based on particular facial expressions, gestures, intonation or pitch information, or other sensor input data received from the audiovisual audience devices 106. Updating the interestingness algorithm based on historical audience data may allow features associated with interestingness (e.g., facial expressions, gestures, eye focus patterns, etc.) to be identified automatically or emergently. Additionally or alternatively, updating the interestingness algorithm based on historical audience data may account for differences in audience culture or composition (e.g., adapting to cultural differences between audiences from different countries).

In some embodiments, in block 430, the audiovisual server 108 may update the interestingness algorithm based on historical presenter and/or audience data that originated from other communication sessions. The audiovisual server 108 may update the interestingness algorithm based on data associated with prior communication sessions that involve the same presenter and/or audience members. Additionally or alternatively, the audiovisual server 108 may update the interestingness algorithm based on data associated with any prior communication sessions, including sessions not involving the current presenter and/or audience members. After updating the interestingness rating algorithm, the method 400 loops back to block 402 to continue receiving audiovisual streams from the audiovisual client devices 102.

Examples

Illustrative examples of the technologies disclosed herein are provided below. An embodiment of the technologies may include any one or more, and any combination of, the examples described below.

Example 1 includes an audiovisual server for audiovisual communication, the audiovisual server comprising a mixer module to receive a plurality of audiovisual streams from a plurality of audiovisual audience devices, wherein each audiovisual stream is captured by a corresponding audiovisual audience device; and an interestingness module to receive sensor input data from each of the plurality of audiovisual audience devices, the sensor input data indicative of a state of a user of the corresponding audiovisual audience device; determine, using an interestingness algorithm, an interestingness rating associated with each audiovisual audience device based on the sensor input data; and select an audiovisual stream of the plurality of audiovisual streams based on the interestingness rating associated with each audiovisual client device; wherein the mixer module is further to transmit the selected audiovisual stream to an audiovisual presenter device.

Example 2 includes the subject matter of Example 1, and wherein the interestingness module is further to rank the plurality of audiovisual audience devices based on the associated interestingness rating; and wherein to select the audiovisual stream comprises to select an audiovisual stream captured by an audiovisual audience device that has the highest interestingness rating.

Example 3 includes the subject matter of any of Examples 1 and 2, and wherein the interestingness rating comprises an accuracy value, a relevancy value, or representativeness value associated with each audiovisual audience device.

Example 4 includes the subject matter of any of Examples 1-3, and wherein the interestingness rating is indicative of an engagement level of a user of the audiovisual audience device.

Example 5 includes the subject matter of any of Examples 1-4, and wherein the sensor input data comprises eye tracking data, facial expression data, voice pitch data, voice intonation data, or temperature data.

Example 6 includes the subject matter of any of Examples 1-5, and wherein the interestingness module is further to determine whether accuracy of the interestingness rating of a corresponding audiovisual audience device could be improved by focusing on a particular parameter of the state of the user; and transmit instructions to the corresponding audiovisual audience device to focus the sensor input data on the particular parameter of the user in response to a determination that the accuracy of the interestingness rating may be improved.

Example 7 includes the subject matter of any of Examples 1-6, and wherein the interestingness module is further to update the interestingness algorithm based on the interestingness ratings.

Example 8 includes the subject matter of any of Examples 1-7, and wherein to update the interestingness algorithm comprises to receive sensor input data from the audiovisual presenter device, the sensor input data indicative of a physical environment of the audiovisual presenter device; and update the interestingness algorithm based on the sensor input data received from the audiovisual presenter device.

Example 9 includes the subject matter of any of Examples 1-8, and wherein the interestingness module is further to select a second audiovisual stream of the plurality of audiovisual streams based on the interestingness rating associated with each audiovisual client device; the mixer module is further to transmit the second audiovisual stream to the audiovisual presenter client device; and to update the interestingness algorithm comprises to determine a presenter attention level associated with each of the selected audiovisual stream and the second audiovisual stream, the presenter attention level based on the sensor input data received from the audiovisual presenter device; compare the presenter attention level associated with each of the selected audiovisual stream and the second audiovisual stream with the interestingness rating associated with each audiovisual client device; and update the interestingness algorithm based on a comparison between the presenter attention level and the interesting rating.

Example 10 includes the subject matter of any of Examples 1-9, and wherein to update the interestingness algorithm further comprises to update the interestingness algorithm based on the sensor input data received from each of the plurality of audiovisual audience devices.

Example 11 includes the subject matter of any of Examples 1-10, and wherein to update the interestingness algorithm comprises to update the interestingness algorithm based on an interestingness rating associated with another audiovisual communication session.

Example 12 includes the subject matter of any of Examples 1-11, and wherein the other audiovisual communication session comprises a prior audiovisual communication session of the audiovisual presenter device.

Example 13 includes the subject matter of any of Examples 1-12, and wherein the mixer module is further to receive a presenter audiovisual stream from the audiovisual presenter device; and transmit the presenter audiovisual stream to the plurality of audiovisual audience devices.

Example 14 includes the subject matter of any of Examples 1-13, and wherein the presenter audiovisual stream is captured by the audiovisual presenter device.

Example 15 includes the subject matter of any of Examples 1-14, and wherein the mixer module is further to receive a plurality of presenter audiovisual streams from the audiovisual presenter device, the plurality of presenter audiovisual streams to include the presenter audiovisual stream; and the interestingness module is further to determine a presenter interestingness rating associated with each presenter audiovisual stream device based on the sensor input data, using the interestingness algorithm; and select the presenter audiovisual stream of the plurality of presenter audiovisual streams based on the presenter interestingness rating associated with each presenter audiovisual stream.

Example 16 includes the subject matter of any of Examples 1-15, and wherein the mixer module is further to transmit the interestingness rating associated with the selected audiovisual stream to the audiovisual presenter device.

Example 17 includes an audiovisual client device for audiovisual communication, the audiovisual client device comprising an audiovisual capture module to (i) capture an audiovisual input stream and (ii) transmit the audiovisual input stream to an audiovisual server; and a sensor control module to (i) capture sensor input data indicative of a state of a user of the audiovisual client device, (ii) analyze the sensor input data to generate abstracted sensor input data representative of the sensor input data, and (iii) transmit the abstracted sensor input data to the audiovisual server.

Example 18 includes the subject matter of Example 17, and wherein the audiovisual client device comprises an audiovisual audience device; and the sensor control module is further to (i) receive instructions to focus the sensor input data from the audiovisual server and (ii) focus the sensor input data in response to receipt of the instructions.

Example 19 includes the subject matter of any of Examples 17 and 18, and wherein the sensor input data is indicative of an engagement level of a user of the audiovisual client device.

Example 20 includes the subject matter of any of Examples 17-19, and wherein the sensor input data comprises eye tracking sensor data, facial expression sensor data, intonation pitch sensor data or temperature data.

Example 21 includes the subject matter of any of Examples 17-20, and wherein the audiovisual client device comprises an audiovisual presenter device, the audiovisual presenter device further comprising a display module to receive an audiovisual stream from the audiovisual server, the audiovisual stream to originate from an audiovisual audience device and be selected based on an interestingness value associated with the audiovisual audience device; and display the audiovisual stream.

Example 22 includes the subject matter of any of Examples 17-21, and wherein to display the audiovisual stream further comprises to display an indication of the interestingness value associated with the audiovisual audience device of the audiovisual stream.

Example 23 includes the subject matter of any of Examples 17-22, and further including an interestingness module to determine the interestingness rating associated with the audiovisual audience device using an interestingness algorithm.

Example 24 includes the subject matter of any of Examples 17-23, and wherein the interestingness module is further to update the interestingness algorithm based on the abstracted sensor input data.

Example 25 includes the subject matter of any of Examples 17-24, and wherein the display module is further to receive a second audiovisual stream from the audiovisual server, the second audiovisual stream to originate from a second audiovisual audience device and be selected based on an interestingness value associated with the second audiovisual audience device; and to update the interestingness algorithm comprises to determine a presenter attention level associated with each of the audiovisual stream and the second audiovisual stream, the presenter attention level based on the abstracted sensor input data; compare the presenter attention level associated with each of the audiovisual stream and the second audiovisual stream with the interestingness rating associated with each audiovisual audience device; and update the interestingness algorithm based on a comparison between the presenter attention level and the interesting rating.

Example 26 includes a method for audiovisual communication, the method comprising receiving, by an audiovisual server, a plurality of audiovisual streams from a plurality of audiovisual audience devices, wherein each audiovisual stream is captured by a corresponding audiovisual audience device; receiving, by the audiovisual server, sensor input data from each of the plurality of audiovisual audience devices, the sensor input data indicative of a state of a user of the corresponding audiovisual audience device; determining, by the audiovisual server using an interestingness algorithm, an interestingness rating associated with each audiovisual audience device based on the sensor input data; selecting, by the audiovisual server, an audiovisual stream of the plurality of audiovisual streams based on the interestingness rating associated with each audiovisual client device; and transmitting, by the audiovisual server, the selected audiovisual stream to an audiovisual presenter device.

Example 27 includes the subject matter of Example 26, and further including ranking, by the audiovisual server, the plurality of audiovisual audience devices based on the associated interestingness rating; wherein selecting the audiovisual stream comprises selecting an audiovisual stream captured by an audiovisual audience device that has the highest interestingness rating.

Example 28 includes the subject matter of any of Examples 26 and 27, and wherein determining the interestingness rating comprises determining an accuracy value, a relevancy value, or representativeness value associated with each audiovisual audience device.

Example 29 includes the subject matter of any of Examples 26-28, and wherein determining the interestingness rating comprises determining an interestingness rating indicative of an engagement level of a user of the audiovisual audience device.

Example 30 includes the subject matter of any of Examples 26-29, and wherein receiving the sensor input data comprises receiving eye tracking data, facial expression data, voice pitch data, voice intonation data, or temperature data from the audiovisual client device.

Example 31 includes the subject matter of any of Examples 26-30, and further including determining, by the audiovisual server, whether accuracy of the interestingness rating of a corresponding audiovisual audience device could be improved by focusing on a particular parameter of the state of the user; and transmitting, by the audiovisual server, instructions to an audiovisual audience device to focus the sensor input data on the particular parameter of the user in response to determining the accuracy of the interestingness rating may be improved.

Example 32 includes the subject matter of any of Examples 26-31, and further including updating, by the audiovisual server, the interestingness algorithm based on the interestingness ratings.

Example 33 includes the subject matter of any of Examples 26-32, and wherein updating the interestingness algorithm comprises receiving, by the audiovisual server, sensor input data from the audiovisual presenter device, the sensor input data indicative of a physical environment of the audiovisual presenter device; and updating the interestingness algorithm based on the sensor input data received from the audiovisual presenter device.

Example 34 includes the subject matter of any of Examples 26-33, and further including selecting, by the audiovisual server, a second audiovisual stream of the plurality of audiovisual streams based on the interestingness rating associated with each audiovisual client device; and transmitting, by the audiovisual server, the second audiovisual stream to the audiovisual presenter client device; wherein updating the interestingness algorithm comprises: determining a presenter attention level associated with each of the selected audiovisual stream and the second audiovisual stream, the presenter attention level based on the sensor input data received from the audiovisual presenter device; comparing the presenter attention level associated with each of the selected audiovisual stream and the second audiovisual stream with the interestingness rating associated with each audiovisual client device; and updating the interestingness algorithm based on comparing the presenter attention level and the interesting rating.

Example 35 includes the subject matter of any of Examples 26-34, and wherein updating the interestingness algorithm further comprises updating the interestingness algorithm based on the sensor input data received from each of the plurality of audiovisual audience devices.

Example 36 includes the subject matter of any of Examples 26-35, and wherein updating the interestingness algorithm comprises updating the interestingness algorithm based on an interestingness rating associated with another audiovisual communication session.

Example 37 includes the subject matter of any of Examples 26-36, and wherein the other audiovisual communication session comprises a prior audiovisual communication session of the audiovisual presenter device.

Example 38 includes the subject matter of any of Examples 26-37, and further including receiving, by the audiovisual server, a presenter audiovisual stream from the audiovisual presenter device; and transmitting, by the audiovisual server, the presenter audiovisual stream to the plurality of audiovisual audience devices.

Example 39 includes the subject matter of any of Examples 26-38, and wherein receiving the presenter audiovisual stream comprises receiving a presenter audiovisual stream captured by the audiovisual presenter device.

Example 40 includes the subject matter of any of Examples 26-39, and further including receiving, by the audiovisual server, a plurality of presenter audiovisual streams from the audiovisual presenter device, the plurality of presenter audiovisual streams to include the presenter audiovisual stream; determining, by the audiovisual server, a presenter interestingness rating associated with each presenter audiovisual stream device based on the sensor input data, using the interestingness algorithm; and selecting, by the audiovisual server, the presenter audiovisual stream of the plurality of presenter audiovisual streams based on the presenter interestingness rating associated with each presenter audiovisual stream.

Example 41 includes the subject matter of any of Examples 26-40, and further including transmitting, by the audiovisual server, the interestingness rating associated with the selected audiovisual stream to the audiovisual presenter device.

Example 42 includes a method for audiovisual communication, the method comprising capturing, by an audiovisual client device, an audiovisual input stream; transmitting, by the audiovisual client device, the audiovisual input stream to an audiovisual server; capturing, by an audiovisual audience device, sensor input data indicative of a state of a user of the audiovisual client device; analyzing, by the audiovisual client device, the sensor input data to generate abstracted sensor input data representative of the sensor input data; and transmitting, by the audiovisual client device, the abstracted sensor input data to the audiovisual server.

Example 43 includes the subject matter of Example 42, and wherein the audiovisual client device comprises an audiovisual audience device, the method further comprising receiving, by the audiovisual audience device, instructions to focus the sensor input data from the audiovisual server; and focusing, by the audiovisual audience device, the sensor input data in response to receiving the instructions.

Example 44 includes the subject matter of any of Examples 42 and 43, and wherein capturing the sensor data comprises capturing sensor data indicative of an engagement level of a user of the audiovisual audience device.

Example 45 includes the subject matter of any of Examples 42-44, and wherein capturing the sensor input data comprises capturing eye tracking sensor data, facial expression sensor data, intonation pitch sensor data or temperature data.

Example 46 includes the subject matter of any of Examples 42-45, and wherein the audiovisual client device comprises an audiovisual presenter device, the method further comprising receiving, by the audiovisual presenter device, an audiovisual stream from the audiovisual server, the audiovisual stream originating from an audiovisual audience device and selected based on an interestingness value associated with the audiovisual audience device; and displaying, by the audiovisual presenter device, the audiovisual stream.

Example 47 includes the subject matter of any of Examples 42-46, and wherein displaying the audiovisual stream further comprises displaying an indication of the interestingness value associated with the audiovisual audience device of the audiovisual stream.

Example 48 includes the subject matter of any of Examples 42-47, and further including determining, by the audiovisual presenter device, the interestingness rating associated with the audiovisual audience device using an interestingness algorithm.

Example 49 includes the subject matter of any of Examples 42-48, and further including updating the interestingness algorithm based on the abstracted sensor input data.

Example 50 includes the subject matter of any of Examples 42-49, and further including receiving, by the audiovisual presenter device, a second audiovisual stream from the audiovisual server, the second audiovisual stream originating from a second audiovisual audience device and selected based on an interestingness value associated with the second audiovisual audience device; and wherein updating the interestingness algorithm comprises: determining a presenter attention level associated with each of the audiovisual stream and the second audiovisual stream, the presenter attention level based on the abstracted sensor input data; comparing the presenter attention level associated with each of the audiovisual stream and the second audiovisual stream with the interestingness rating associated with each audiovisual audience device; and updating the interestingness algorithm based on comparing the presenter attention level and the interesting rating.

Example 51 includes a computing device comprising a processor; and a memory having stored therein a plurality of instructions that when executed by the processor cause the computing device to perform the method of any of Examples 26-50.

Example 52 includes one or more machine readable storage media comprising a plurality of instructions stored thereon that in response to being executed result in a computing device performing the method of any of Examples 26-50.

Example 53 includes a computing device comprising means for performing the method of any of Examples 26-50.

Example 54 includes an audiovisual server for audiovisual communication, the audiovisual server comprising means for receiving a plurality of audiovisual streams from a plurality of audiovisual audience devices, wherein each audiovisual stream is captured by a corresponding audiovisual audience device; means for receiving sensor input data from each of the plurality of audiovisual audience devices, the sensor input data indicative of a state of a user of the corresponding audiovisual audience device; means for determining, using an interestingness algorithm, an interestingness rating associated with each audiovisual audience device based on the sensor input data; means for selecting an audiovisual stream of the plurality of audiovisual streams based on the interestingness rating associated with each audiovisual client device; and means for transmitting the selected audiovisual stream to an audiovisual presenter device.

Example 55 includes the subject matter of Example 54, and further including means for ranking the plurality of audiovisual audience devices based on the associated interestingness rating; wherein the means for selecting the audiovisual stream comprises means for selecting an audiovisual stream captured by an audiovisual audience device that has the highest interestingness rating.

Example 56 includes the subject matter of any of Examples 54 and 55, and wherein the means for determining the interestingness rating comprises means for determining an accuracy value, a relevancy value, or representativeness value associated with each audiovisual audience device.

Example 57 includes the subject matter of any of Examples 54-56, and wherein the means for determining the interestingness rating comprises means for determining an interestingness rating indicative of an engagement level of a user of the audiovisual audience device.

Example 58 includes the subject matter of any of Examples 54-57, and wherein the means for receiving the sensor input data comprises means for receiving eye tracking data, facial expression data, voice pitch data, voice intonation data, or temperature data from the audiovisual client device.

Example 59 includes the subject matter of any of Examples 54-58, and further including means for determining whether accuracy of the interestingness rating of a corresponding audiovisual audience device could be improved by focusing on a particular parameter of the state of the user; and means for transmitting instructions to an audiovisual audience device to focus the sensor input data on the particular parameter of the user in response to determining the accuracy of the interestingness rating may be improved.

Example 60 includes the subject matter of any of Examples 54-59, and further including means for updating the interestingness algorithm based on the interestingness ratings.

Example 61 includes the subject matter of any of Examples 54-60, and wherein the means for updating the interestingness algorithm comprises means for receiving sensor input data from the audiovisual presenter device, the sensor input data indicative of a physical environment of the audiovisual presenter device; and means for updating the interestingness algorithm based on the sensor input data received from the audiovisual presenter device.

Example 62 includes the subject matter of any of Examples 54-61, and further including means for selecting a second audiovisual stream of the plurality of audiovisual streams based on the interestingness rating associated with each audiovisual client device; and means for transmitting the second audiovisual stream to the audiovisual presenter client device; wherein the means for updating the interestingness algorithm comprises: means for determining a presenter attention level associated with each of the selected audiovisual stream and the second audiovisual stream, the presenter attention level based on the sensor input data received from the audiovisual presenter device; means for comparing the presenter attention level associated with each of the selected audiovisual stream and the second audiovisual stream with the interestingness rating associated with each audiovisual client device; and means for updating the interestingness algorithm based on comparing the presenter attention level and the interesting rating.

Example 63 includes the subject matter of any of Examples 54-62, and wherein the means for updating the interestingness algorithm further comprises means for updating the interestingness algorithm based on the sensor input data received from each of the plurality of audiovisual audience devices.

Example 64 includes the subject matter of any of Examples 54-63, and wherein the means for updating the interestingness algorithm comprises means for updating the interestingness algorithm based on an interestingness rating associated with another audiovisual communication session.

Example 65 includes the subject matter of any of Examples 54-64, and wherein the other audiovisual communication session comprises a prior audiovisual communication session of the audiovisual presenter device.

Example 66 includes the subject matter of any of Examples 54-65, and further including means for receiving a presenter audiovisual stream from the audiovisual presenter device; and means for transmitting the presenter audiovisual stream to the plurality of audiovisual audience devices.

Example 67 includes the subject matter of any of Examples 54-66, and wherein the means for receiving the presenter audiovisual stream comprises means for receiving a presenter audiovisual stream captured by the audiovisual presenter device.

Example 68 includes the subject matter of any of Examples 54-67, and further including means for receiving a plurality of presenter audiovisual streams from the audiovisual presenter device, the plurality of presenter audiovisual streams to include the presenter audiovisual stream; means for determining a presenter interestingness rating associated with each presenter audiovisual stream device based on the sensor input data, using the interestingness algorithm; and means for selecting the presenter audiovisual stream of the plurality of presenter audiovisual streams based on the presenter interestingness rating associated with each presenter audiovisual stream.

Example 69 includes the subject matter of any of Examples 54-68, and further including means for transmitting the interestingness rating associated with the selected audiovisual stream to the audiovisual presenter device.

Example 70 includes an audiovisual client device for audiovisual communication, the audiovisual client device comprising means for capturing an audiovisual input stream; means for transmitting the audiovisual input stream to an audiovisual server; means for capturing sensor input data indicative of a state of a user of the audiovisual client device; means for analyzing the sensor input data to generate abstracted sensor input data representative of the sensor input data; and means for transmitting the abstracted sensor input data to the audiovisual server.

Example 71 includes the subject matter of Example 70, and wherein the audiovisual client device comprises an audiovisual audience device, the audiovisual audience device further comprising means for receiving instructions to focus the sensor input data from the audiovisual server; and means for focusing the sensor input data in response to receiving the instructions.

Example 72 includes the subject matter of any of Examples 70 and 71, and wherein the means for capturing the sensor data comprises means for capturing sensor data indicative of an engagement level of a user of the audiovisual audience device.

Example 73 includes the subject matter of any of Examples 70-72, and wherein the means for capturing the sensor input data comprises means for capturing eye tracking sensor data, facial expression sensor data, intonation pitch sensor data or temperature data.

Example 74 includes the subject matter of any of Examples 70-73, and wherein the audiovisual client device comprises an audiovisual presenter device, the audiovisual presenter device further comprising means for receiving an audiovisual stream from the audiovisual server, the audiovisual stream originating from an audiovisual audience device and selected based on an interestingness value associated with the audiovisual audience device; and means for displaying the audiovisual stream.

Example 75 includes the subject matter of any of Examples 70-74, and wherein the means for displaying the audiovisual stream further comprises means for displaying an indication of the interestingness value associated with the audiovisual audience device of the audiovisual stream.

Example 76 includes the subject matter of any of Examples 70-75, and further including means for determining the interestingness rating associated with the audiovisual audience device using an interestingness algorithm.

Example 77 includes the subject matter of any of Examples 70-76, and further including means for updating the interestingness algorithm based on the abstracted sensor input data.

Example 78 includes the subject matter of any of Examples 70-77, and further including means for receiving a second audiovisual stream from the audiovisual server, the second audiovisual stream originating from a second audiovisual audience device and selected based on an interestingness value associated with the second audiovisual audience device; and wherein the means for updating the interestingness algorithm comprises: means for determining a presenter attention level associated with each of the audiovisual stream and the second audiovisual stream, the presenter attention level based on the abstracted sensor input data; means for comparing the presenter attention level associated with each of the audiovisual stream and the second audiovisual stream with the interestingness rating associated with each audiovisual audience device; and means for updating the interestingness algorithm based on comparing the presenter attention level and the interesting rating.

The invention claimed is:

1. An audiovisual client device for audiovisual communication, the audiovisual client device comprising:
    an audiovisual capture module to (i) capture an audiovisual input stream and (ii) transmit the audiovisual input stream to an audiovisual server;
    a sensor control module to (i) capture sensor input data indicative of a state of a user of the audiovisual client device, (ii) analyze the sensor input data to generate abstracted sensor input data representative of the sensor input data, (iii) transmit the abstracted sensor input data to the audiovisual server, (iv) receive, in response to transmission of the abstracted sensor input data, instructions to focus the sensor input data from the audiovisual server, and (v) focus the sensor input data to be captured in response to receipt of the instructions;
    a display module to (i) receive an audiovisual stream from the audiovisual server, the audiovisual stream to originate from an audiovisual audience device and be selected based on an interestingness value associated with the audiovisual audience device, (ii) display the audiovisual stream, and (iii) receive a second audiovisual stream from the audiovisual server, the second audiovisual stream to originate from a second audiovisual audience device and be selected based on a second interestingness value associated with the second audiovisual audience device; and
    an interestingness module to (i) determine an interestingness rating associated with the audiovisual audience device using an interestingness algorithm and (ii) update the interestingness algorithm based on the abstracted sensor input data, wherein to update the interestingness algorithm comprises to determine a presenter attention level associated with each of the audiovisual stream and the second audiovisual stream, the presenter attention level based on the abstracted sensor input data, compare the presenter attention level associated with each of the audiovisual stream and the second audiovisual stream with the interestingness rating associated with each audiovisual audience device, and update the interestingness algorithm based on a comparison between the presenter attention level and the interestingness rating;
    wherein the audiovisual client device comprises an audiovisual audience device and an audiovisual presenter device.

2. The audiovisual client device of claim 1, wherein the sensor input data is indicative of an engagement level of a user of the audiovisual client device.

3. The audiovisual client device of claim 1, wherein the sensor input data comprises eye tracking sensor data, facial expression sensor data, intonation pitch sensor data or temperature data.

4. The audiovisual presenter device of claim 1, wherein to display the audiovisual stream further comprises to display an indication of the interestingness value associated with the audiovisual audience device of the audiovisual stream.

5. A method for audiovisual communication, the method comprising:
    capturing, by an audiovisual client device, an audiovisual input stream;
    transmitting, by the audiovisual client device, the audiovisual input stream to an audiovisual server;
    capturing, by an audiovisual audience device, sensor input data indicative of a state of a user of the audiovisual client device;
    analyzing, by the audiovisual client device, the sensor input data to generate abstracted sensor input data representative of the sensor input data;
    transmitting, by the audiovisual client device, the abstracted sensor input data to the audiovisual server;
    receiving, in response to transmission of the abstracted sensor input data and by the audiovisual audience device, instructions to focus the sensor input data from the audiovisual server;
    focusing, by the audiovisual audience device, the sensor input data to be captured in response to receiving the instructions;
    receiving, by the audiovisual audience device, an audiovisual stream from the audiovisual server, the audiovisual stream originating from an audiovisual audience device and selected based on an interestingness value associated with the audiovisual audience device;
    displaying, by the audiovisual audience device, the audiovisual stream;
    determining, by the audiovisual presenter device, an interestingness rating associated with the audiovisual audience device using an interestingness algorithm;
    receiving, by the audiovisual presenter device, a second audiovisual stream from the audiovisual server, the second audiovisual stream originating from a second audiovisual audience device and selected based on a second interestingness value associated with the second audiovisual audience device; and
    updating the interestingness algorithm based on the abstracted sensor input data, wherein updating the interestingness algorithm comprises (i) determining a presenter attention level associated with each of the audiovisual stream and the second audiovisual stream, the presenter attention level based on the abstracted sensor input data, (ii) comparing the presenter attention level associated with each of the audiovisual stream and the second audiovisual stream with the interestingness rating associated with each audiovisual audience device, and (iii) updating the interestingness algorithm based on comparing the presenter attention level and the interestingness rating;

wherein the audiovisual client device comprises an audiovisual audience device and an audiovisual presenter device.

6. One or more non-transitory, computer-readable storage media comprising a plurality of instructions that in response to being executed cause an audiovisual client device to:

capture an audiovisual input stream;

transmit the audiovisual input stream to an audiovisual server;

capture sensor input data indicative of a state of a user of the audiovisual client device;

analyze the sensor input data to generate abstracted sensor input data representative of the sensor input data;

transmit the abstracted sensor input data to the audiovisual server;

receive, in response to transmission of the abstracted sensor input data, instructions to focus the sensor input data from the audiovisual server;

focus the sensor input data to be captured in response to receiving the instructions;

wherein the audiovisual client device comprises an audiovisual audience device;

receive an audiovisual stream from the audiovisual server, the audiovisual stream originating from an audiovisual audience device and selected based on an interestingness value associated with the audiovisual audience device;

display the audiovisual stream;

determine an interestingness rating associated with the audiovisual audience device using an interestingness algorithm;

receive a second audiovisual stream from the audiovisual server, the second audiovisual stream originating from a second audiovisual audience device and selected based on a second interestingness value associated with the second audiovisual audience device; and update the interestingness algorithm based on the abstracted sensor input data, wherein to update the interestingness algorithm comprises to (i) determine a presenter attention level associated with each of the audiovisual stream and the second audiovisual stream, the presenter attention level based on the abstracted sensor input data, (ii) compare the presenter attention level associated with each of the audiovisual stream and the second audiovisual stream with the interestingness rating associated with each audiovisual audience device, and (iii) update the interestingness algorithm based on comparing the presenter attention level and the interestingness rating.

7. The one or more non-transitory, computer-readable storage media of claim 6, wherein to capture the sensor data comprises to capture sensor data indicative of an engagement level of a user of the audiovisual client device.

8. The one or more non-transitory, computer-readable storage media of claim 6, wherein the sensor input data comprises eye tracking sensor data, facial expression sensor data, intonation pitch sensor data or temperature data.

9. The method of claim 5, wherein capturing the sensor data comprises capturing sensor data indicative of an engagement level of a user of the audiovisual client device.

10. The method of claim 5, wherein the sensor input data comprises eye tracking sensor data, facial expression sensor data, intonation pitch sensor data or temperature data.

* * * * *